United States Patent [19]

Heightshoe

[11] 3,945,083

[45] Mar. 23, 1976

[54] GAME DRESSING BOARD

[76] Inventor: Lawrence H. Heightshoe, Rte. 1, Backus, Mich. 56435

[22] Filed: Mar. 31, 1975

[21] Appl. No.: 563,497

[52] U.S. Cl. ............................................. 17/44.2
[51] Int. Cl.² ........................................... A22B 1/00
[58] Field of Search ........... 17/70, 62, 21, 44, 44.3, 17/44.2

[56] References Cited
UNITED STATES PATENTS

| | | | |
|---|---|---|---|
| 1,022,298 | 4/1912 | Buller | 17/44 |
| 2,932,849 | 4/1960 | Missman | 17/70 |

Primary Examiner—Robert Peshock

[57] ABSTRACT

A game dressing board is provided including a flat panel of suitable material having brackets on opposite sides near the upper end thereof designed to accommodate a transverse rod in spaced relation to the surface thereof. Beneath this rod is a transversely extending plate having a series of notches in spaced relation along the edge of the plate directed toward the lower end of the panel. The panel is transversely grooved beneath the notched edge of the plate. A series of hook-shaped elements are supported by the rod and provided with projecting lugs adopted to engage selectively in any of said notches, in one position thereof, with the hooks extending upwardly and away from the board. The legs of the bird or animal being dressed are impaled on these hooks which are in spaced relation. The body of the bird or animal rests against the panel, permitting the bird and/or animal to be plucked or skinned. A locking slide bar also extending transversely of the panel may be engaged against the hook-shaped elements to hold the hooks in projecting position. While the panel is normally secured on a vertical wall or the like, it may also be secured on a horizontal or inclined plane.

7 Claims, 8 Drawing Figures

GAME DRESSING BOARD

This invention relates to an improvement in Game Dressing Board, and deals particularly with a means of supporting a bird or an animal while the bird or animal is being dressed, plucked or skinned.

BACKGROUND OF THE INVENTION

Various means have been used as a support in dressing game birds such as pheasants, grouse, partridge, ducks, chickens as well as game animals such as rabbits and squirrels. It may also be used to hold fur bearing animals while removing their skin. Such animals might be mink or muskrat.

Most of these devices are makeshift devices such as clamps or the like for securing the game bird or animal against a flat surface while it is being dressed. The present device comprises a reusable apparatus which is adjustable so that it may be used for birds and animals of various sizes. In the past, the devices are not usually similarly adjustable, and are usually designed for birds or animals of a particular type and generally similar size.

SUMMARY OF THE INVENTION

The present invention resides in the provision of a game dressing board having means near one end thereof for positively engaging the legs or the bird or two of the legs of an animal so that the bird or animal may rest against the surface of the board of panel during the dressing operation. In general, the device comprises an elongated panel having brackets secured to opposite sides thereof near one end thereof. These brackets support a rod in spaced relation to the panel and extending transversely thereof. Slideably supported on the rod are a plurality of hook-shaped elements or hangers having hook-shaped portions which extend upwardly and outwardly from the surface of the panel. These elements are preferably pointed so as to facilitate their insertion through slits cut in the rear legs of the animal between the leg tendens and the leg bone above the first leg joint when the device is used for dressing animals.

A feature of the present invention resides in the fact that the hook-shaped elements are held in place upon the rod when in one pivotal position by lugs forming a part of the hook-shaped elements and engageable in evenly spaced notches in the edge of a locator plate which is directed toward the end of the panel opposite that to which the support is secured. When the hook-shaped elements are swung into position in which the lugs engage the notches in the plate, the hook-shaped ends thereof extend forwardly and away from the surface of the panel. By swinging the lugs out of engagement with the notches, the various hook-shaped elements may be moved longitudinally of the rod to adjust for the distance between the legs of the bird or animal being dressed.

A feature of the present invention lies in the fact that the in its preferred form four such hook-shaped elements are provided on the rod. When dressing a bird, the hook-shaped elements are arranged in pairs, the elements of each pair being spaced sufficiently to accommodate the thickness of the bird's leg. The bird is held by the elements by the feet of the bird. When dressing animals, only two of the support hangers are used. The other two hangers may be removed, or moved to a position not to interfere with the support of the animal.

A feature of the present invention resides in the provision of a transverse slot in the panel beneath the slotted edge of the plate so that the lug forming a part of the hook-shaped elements may extend completely through the notches. By extending the lugs completely through the notches, a greater resistance to transverse movement of the support hangers or hook-shaped elements is provided.

A further feature of the present invention resides in the provision of a locking slide bar which is supported on the surface of the panel and moveable toward and away from the notched edge of the plate. When the hook-shaped elements are in position with the lugs thereof engaging in the notches, the locking bar is moved against the lugs, positively locking the hook-shaped elements from pivotal movement.

A further feature of the present invention resides in the manner in which the locking slide bar is supported. The slide bar is provided with a pair of spaced slots positioned near opposite ends of the bar. These slots are of shallow V-shaped formations having end portions which are aligned and in substantially parallel relation to the notched edge of the plate. The slots also include parallel end portions communicating with the aligned portions. Screws or other fastening means extend through these slots and into the panel. By moving the locking slide bar transversely of the panel, the screws or other means extending through the slots will move from the aligned portions of the slots to the parallel inclined portions thereof. When engaged in the inclined portions thereof, the locking slide bar moves away from the notched edge of the plate, and into an unlocked position so that the support hangers or hook-shaped members may be pivoted about the axis of the bar, and moved into an adjusted position.

In preferred form, the panel is supported upon a wall so that the bird or animal is suspended downwardly against the panel. However, the panel may be secured to a plank or similar member inclined upwardly against the wall, or may even be supported in a horizontal position, although this detracts from the efficiency of the dressing operation.

These and other objects and novel features of the present invention will be more clearly and fully set forth in the following specification and claims.

DESCRIPTION OF THE PREFERRED EMBODIMENT

Figure 1:
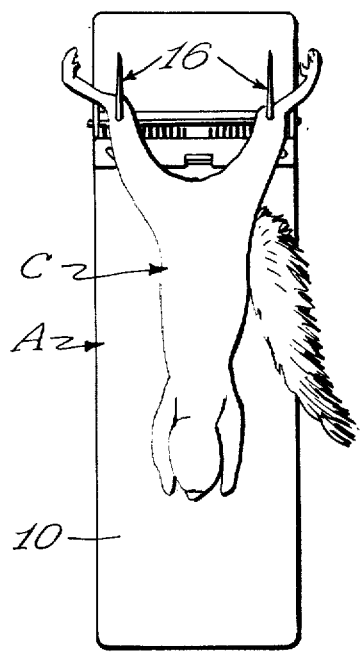
FIG. 1 illustrates the game board supporting an animal such as a squirrel by engagement with the rear legs of the animal.

In general, the game dressing board is indicated in general by the letter A and includes an elongated panel which may be formed of wood, plastic, or other suitable material. In the drawings, the panel 10 is formed of wood, and the game supporting elements secured thereto are formed of metal. However, the material of which the parts are formed is a matter of choice, and any suitable material may be used to form any of the parts described.

A pair of brackets 11 are secured to opposite sides of the board, and are preferably mortised into the edges of the board so that the outer surfaces thereof are flush with the edges of the board by screws or other fastening means 12. The brackets 11 are provided with aligned apertures 13 which support a rod 14 in spaced relation to the surface of the panel 10, and extending transversely of the length of the panel 10. The ends of the rod 14 are preferably grooved to accommodate resilient locking means 15 which hold the rod 14 from axial movement.

Hook-shaped elements which are indicated generally by the numeral 16 are slideably supported upon the rod 14. The hook-shaped elements 16 include an enlarged portion 17 having an aperture 19 extending therethrough. The enlarged central portions 17 of each element are provided with projecting pointed elements 20 which extend from one side thereof so as to provide recesses 21 against which the feet of the bird may rest when the board is used for supporting the bird which is indicated in general by the letter B. The elements 16 also include lugs such as 22 which are designed to engage in the notches in the edge of the plate which will be described.

Figure 2:
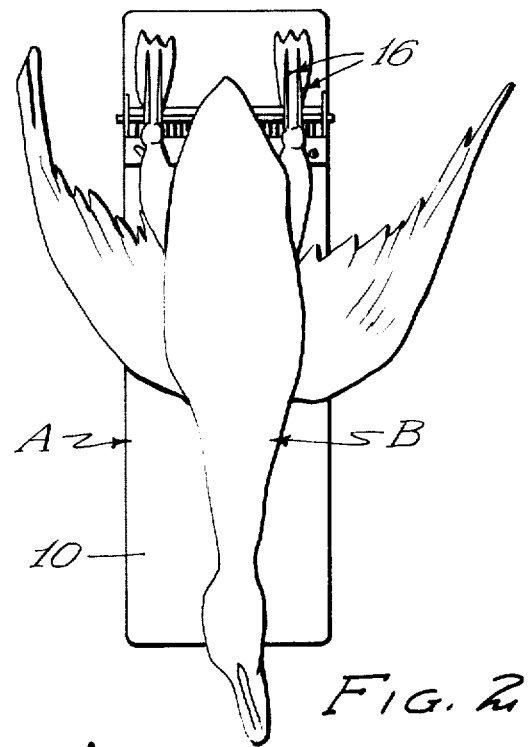
FIG. 2 is an elevational view of the game dressing board supporting a duck or goose for dressing.
Figure 4:
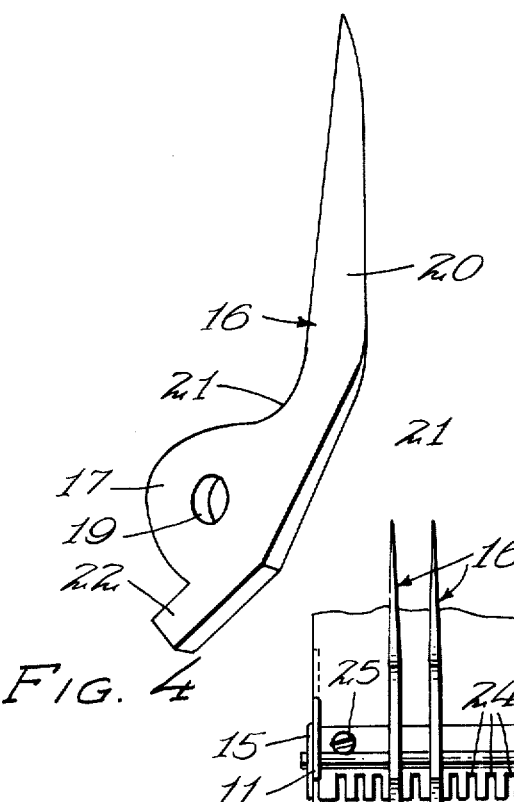
FIG. 4 is a perspective view of one of the pointed support hangers showing one side thereof.
Figure 5:
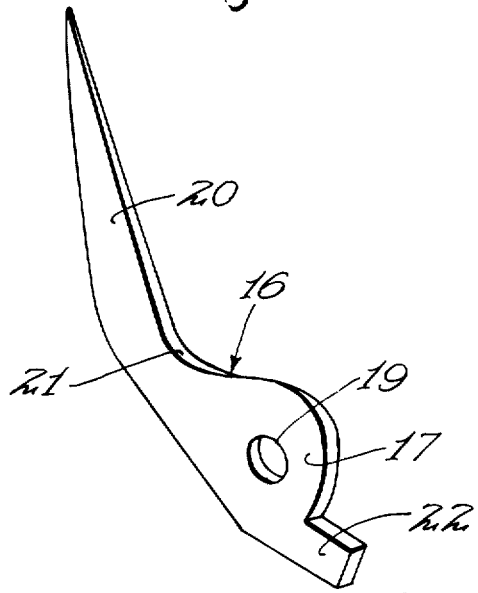
FIG. 5 is a view similar to FIG. 4 but showing the other side of the support hanger.
Figure 3:
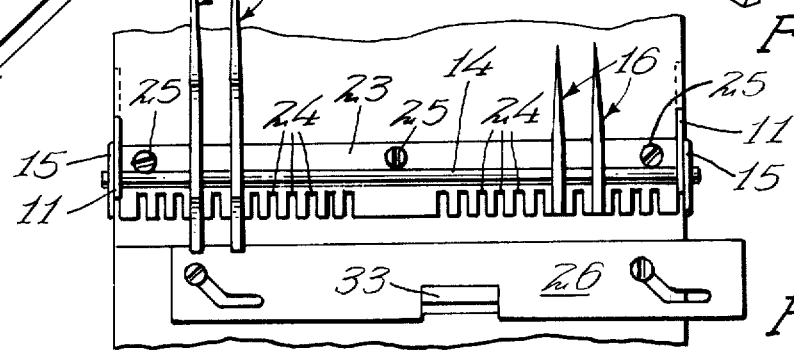
FIG. 3 is a detailed elevational view of the game supporting structure, showing two of the hook-shaped elements or pointed support hangers in upwardly pivoted position, and the other two hangers swung down into position to accommodate the leg of the bird therebetween.

As indicated in FIG. 1, when supporting an animal C, only two such pointed support hangers are employed. As is indicated in FIGS. 2 and 3 of the drawings, when supporting a bird, two such hangers are used in closely spaced relation so that the leg of the bird may be inserted therebetween with the feet of the bird resting upon the recessed portions 21 as indicated in FIGS. 2 of the drawings.

Figure 7:
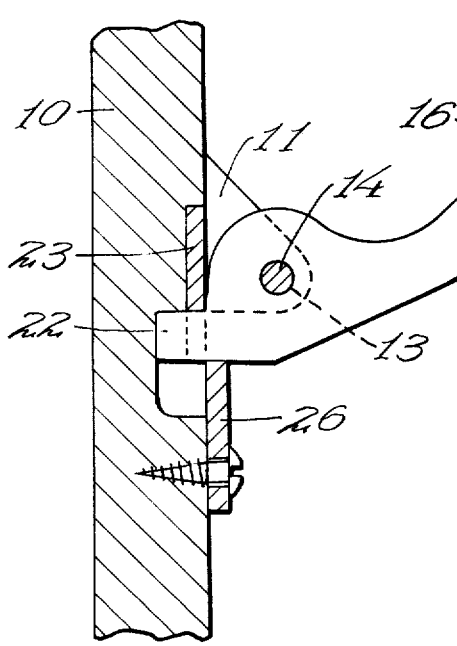
FIG. 7 is a sectional view on the line 7—7 of FIG. 6 showing a pointed support hanger in game or bird supporting position.
Figure 8:
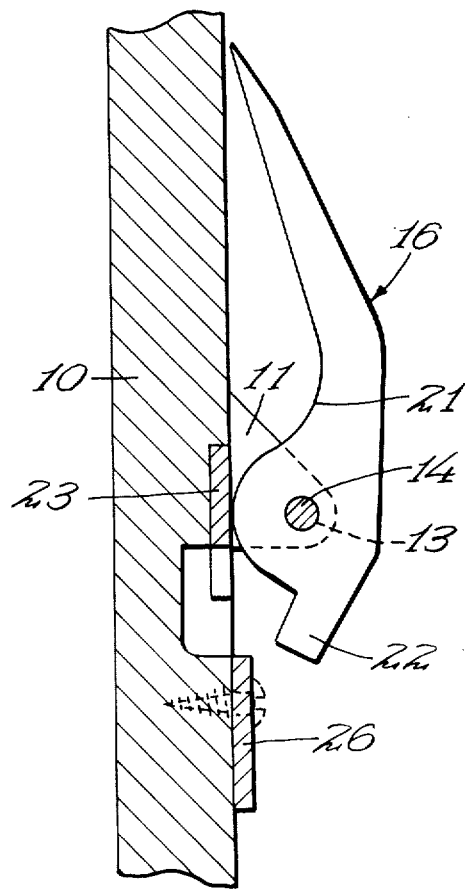
FIG. 8 is a view similar to FIG. 7 but showing the pointed support hanger in inoperable position in which it may be moved longitudinally of the supporting rod.

A plate 23 is recessed into the surface of the board or panel 10 as indicated in FIG. 7 and 8 of the drawings. This plate 23 is provided with spaced notches 24 which are designed to accommodate the lugs 22 of the hangers 16. The notches 24 are designed to accommodate the lugs 22 of the hangers 16. The plate 23 is secured in place by screws 25 or other securing members. The hangers 16 may be moved longitudinally of the rod when they are in the position indicated in FIG. 8 of the drawings. When swung in a clockwise direction as viewed in FIG. 7, the lugs 22 engage in the notches 24 to hold the hangers from lateral movement longitudinally of the rod 14.

Figure 6:
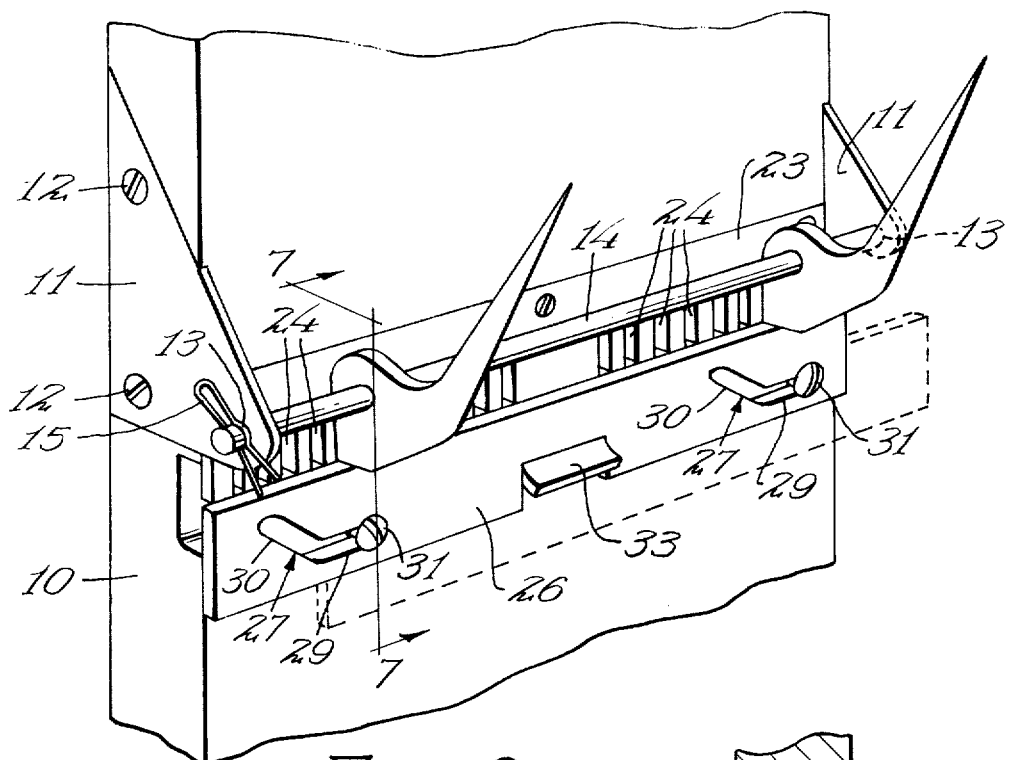
FIG. 6 is a perspective detail view of the device showing a pair of pointed support hangers in position to impale the legs of an animal, and with the locking slide bar in locking position, and showing in dotted outline the locking slide bar in unlocked position.

A locking plate 26 is slideably supported upon the surface of the panel 10. Slightly V-shaped slots 27 are provided in the plate 26, the slots 27 including aligned portions 29, and parallel upwardly inclined end portions 30. Screws 31, or the fastening means extend through the slots 27 so as to properly locate the locking slide bar 26. When the locking slide bar 26 is in the full line position indicated in Figure 6 of the drawings and also shown in FIG. 7, the locking slide bar engages the hook-shaped members adjoining the lugs 22, and hold the hangers engaged in the notches 24. When the locking slide bar is moved to the right as indicated in FIG. 3, and also indicated in dotted outline in FIG. 6 of the drawings, the locking slide bar is retracted to a lower position, permitting the hook-shaped elements or hangers 16 to be pivoted, and to be moved longitudinally of the rod 23.

A handle 33 is provided on the locking bar 26 so that it can be moved between its tow extreme positions.

When the device is used for supporting a bird B, two of the hangers 16 are supported in spaced relation, the distance between these hangers being just sufficient to accommodate the leg of the bird. The feet of the bird limit the extent to which the bird may be moved longitudinally of the panel 10. When used with an animal C, a slit is preferably made with a knife between the leg tendens and leg bone above the first leg joint of the animal and the animal is hung on the support hangers by inserting the point of the hangers through the slots cut in the legs.

When a bird B is supported, it may be either plucked or skinned and dressed in the usual manner. When either plucking feathers or skinning, it may be hung breast out and then unhooked and reversed on the hangers, or vice versa, to complete the operation on both front and back of the bird.

While dressing animals such as C, the hook-shaped elements or hangers 16 are moved to the proper position to support the outstretched hind legs of the animal. Preferably, the process should start with the back of the animal against the board and hind legs turned outward toward the edge of the board. The animal may be skinned, and also suspended in this position to slit open and remove the viscera.

The game dressing board which is provided is capable of handling any game bird, or game animal. Obviously, the size of the board does not permit the dressing of game animals such as deer, elk, or moose, or a larger version of the device could be produced for this purpose. The structure has been found extremely practical in actual use and saves considerable time from the previous procedure of attempting to hold the animal in a certain position while plucking the feathers or skinning the bird or animal.

In accordance with the Patent Statutes, I have described the principles of construction and operation of my Game Dressing Board, and while I have endeavored to set forth the best embodiments, I desire to have it understood that obvious changes may be made within the scope of the following claims without departing from the spirit of my invention.

I claim:

1. A game dressing board including:
    an elongated panel,
    brackets on opposite sides of said panel and extending forwardly therefrom near one end of said panel,
    a rod supported by said brackets in spaced relation to said board and extending transversely of said panel,
    a plate secured to said panel having spaced notches therein in the edge directed toward the other end of the said panel, a pair of hook-shaped elements slideably supported on said rod having impaling hooks on one side thereof, and having lugs on the other side thereof engageable selectively in any of said notches, said hook-shaped elements being pivotal from a first position with the ends thereof adjoining said panels in which said lugs are disengaged from said notches to a second position in which said hook-shaped elements are spaced from said panel and said lugs are engaged in selected notches.

2. The structure of claim 1 and in which said panel is transversely grooved adjoining the notched edge of said plate and into which said lugs may engage in the said second position of said hook-shaped elements.

3. The structure of claim 1 and including a locking slide bar secured to said panel in spaced relation to said notched edge of said plate and slideably supported for movement toward said notched edge of said plate to hold said lugs in engagement with said notches.

4. The structure of claim 3 and in which said locking slide bar includes parallel inclined slots through which fastening means extend securing said locking slide bar to said panel.

5. The structure of claim 1 and in which said hook-shaped elements include pointed ends.

6. The structure of claim 4 and in which said parallel inclined slots include aligned slot ends through which said fastening means extend when said bar is in lugs are engaged in said slots.

7. The structure of claim 1 and including a second pair of hook-shaped elements similar to said first named hook-shaped elements slideably supported on said rod between said first named pair of hook-shaped elements.

* * * * *

UNITED STATES PATENT OFFICE
CERTIFICATE OF CORRECTION

Patent No. 3,945,083        Dated March 23, 1976

Inventor(s) Lawrence H. Heightshoe

It is certified that error appears in the above-identified patent and that said Letters Patent are hereby corrected as shown below:

On the Cover Sheet, item [76] should read as follows:
-- Inventor:  Laurence H. Heightshoe, Rte 1,
              Backus, Minnesota --

Column 4, line 15, "tow" should read -- two --.

Signed and Sealed this eighth Day of June 1976

[SEAL]

Attest:

RUTH C. MASON
*Attesting Officer*

C. MARSHALL DANN
*Commissioner of Patents and Trademarks*